P. EVANS.
CHANGE SPEED GEAR.
APPLICATION FILED NOV. 2, 1907.
931,289.
Patented Aug. 17, 1909.
4 SHEETS—SHEET 1.
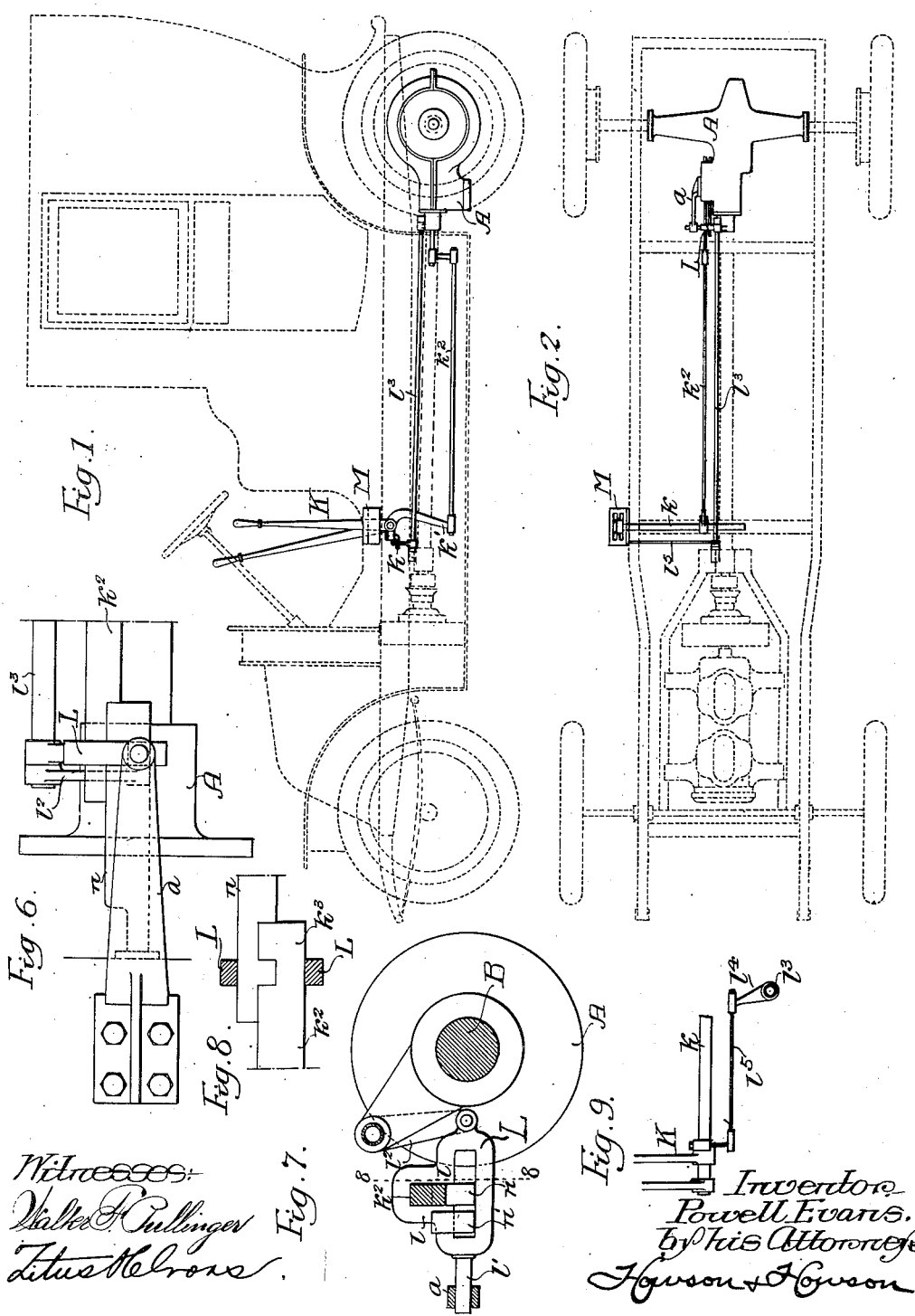

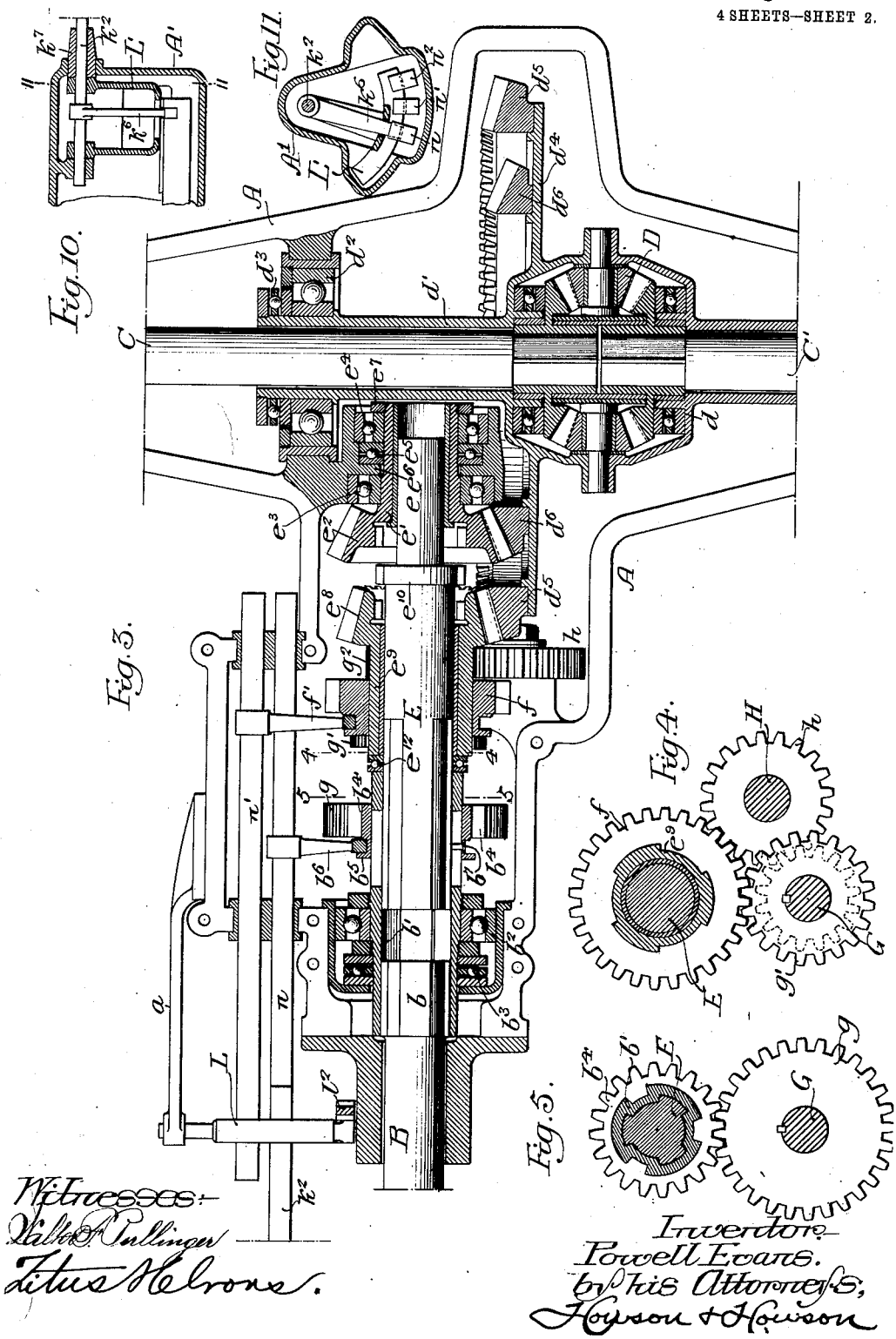

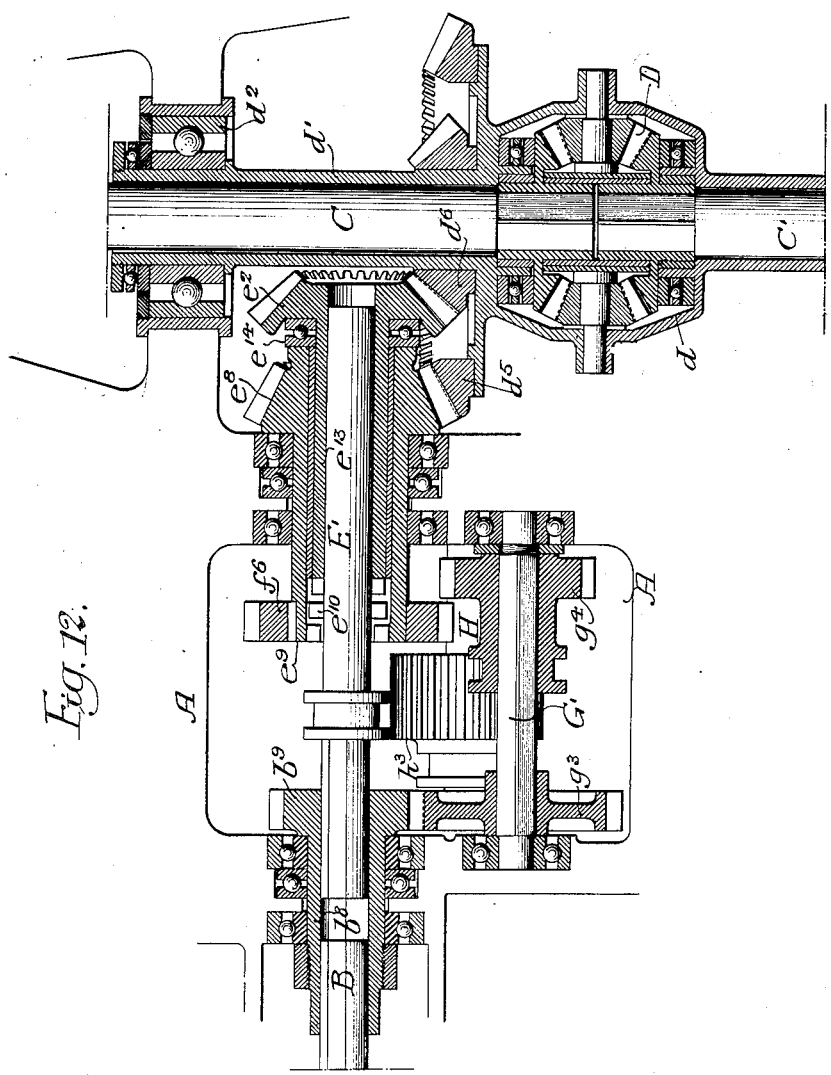

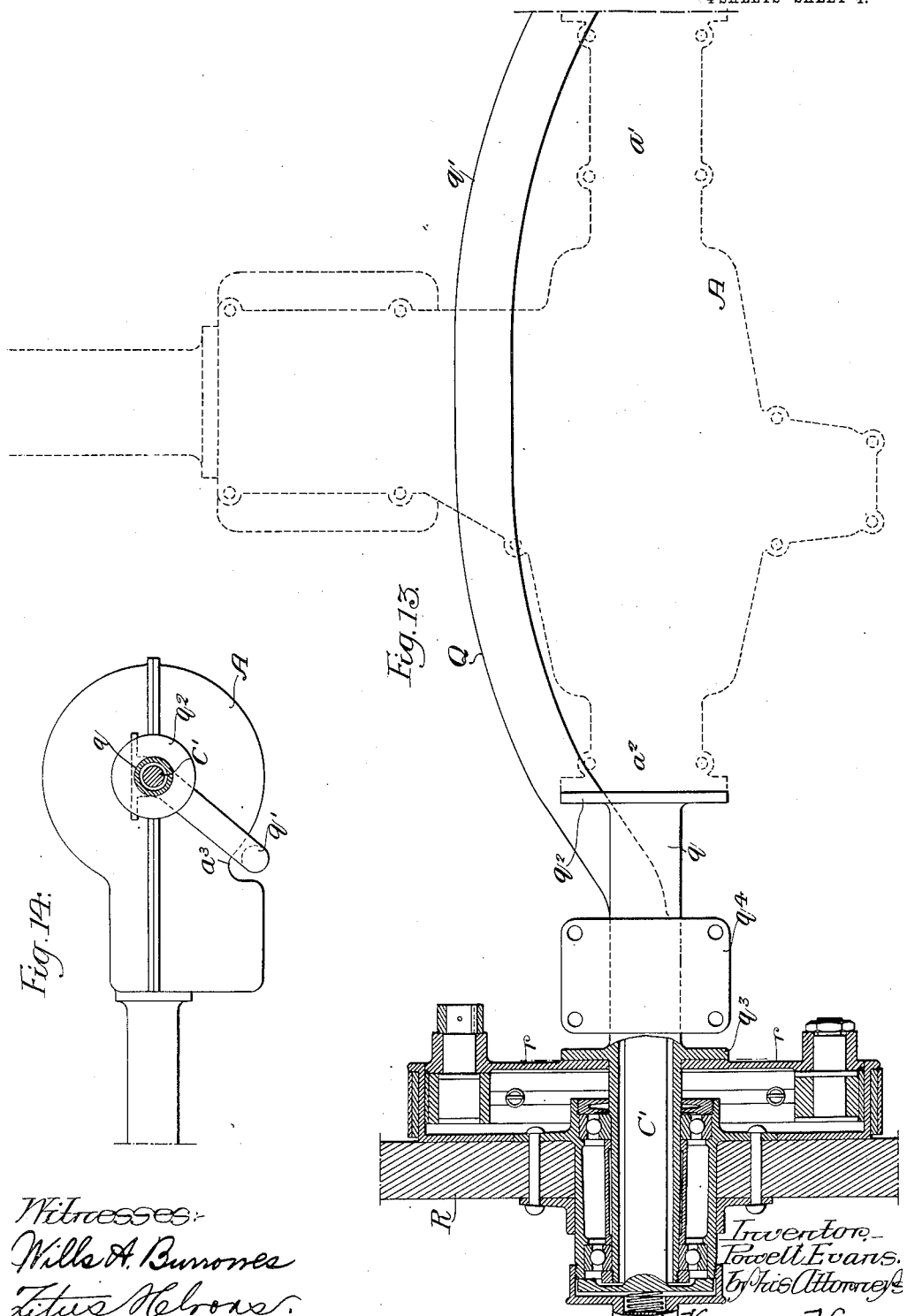

UNITED STATES PATENT OFFICE.

POWELL EVANS, OF PHILADELPHIA, PENNSYLVANIA.

CHANGE-SPEED GEAR.

No. 931,289.

Specification of Letters Patent.

Patented Aug. 17, 1909.

Application filed November 2, 1907. Serial No. 400,330.

*To all whom it may concern:*

Be it known that I, POWELL EVANS, a citizen of the United States, residing in Philadelphia, Pennsylvania, have invented certain Improvements in Change-Speed Gears, of which the following is a specification.

My invention relates to that class of change speed gears and mechanism for controlling the same which is particularly designed for use in connection with motor vehicles, one object of the invention being to provide gearing capable of connecting a driving with a driven shaft, which in addition to being relatively simple as regards the number and arrangement of its parts, shall also have said parts so combined that a minimum number of them shall be in motion when not actually required to transmit power.

I further desire to provide a change speed gear having the above noted characteristics, with a respectively simple device for controlling the positions of its movable members, which device shall be capable of locking in their inoperative positions those parts of the apparatus which it is not intended to use at a given time.

It is also desired to provide an improved structure for supporting the change speed gear and its associated parts.

These objects and other advantageous ends I secure as hereinafter set forth, reference being had to the accompanying drawings, in which:—

Figure 1, is a side elevation to some extent diagrammatic, illustrating my invention as applied to a motor vehicle; Fig. 2, is a plan, to some extent diagrammatic, illustrating the relation of the parts constituting my invention to the frame of the motor vehicle; Fig. 3, is a horizontal section taken through the gear case, illustrating the detailed arrangement and construction of the change speed mechanism constituting one part of my invention; Figs. 4 and 5, are vertical sections taken on the lines 4—4 and 5—5 respectively of Fig. 3; Fig. 6, is a side elevation of the ends of the operating rods and the locking gate; Fig. 7, is a vertical section illustrating the locking gate in front elevation; Fig. 8, is a vertical section on the line 8—8, Fig. 7; Fig. 9, is a side elevation illustrating the detail construction of the connections between the change speed operating lever and the longitudinally extending rods for controlling the combinations of the gears; Fig. 10, is a vertical longitudinal section illustrating a modified construction for connecting the operating rods of the change speed gearing to a single operating rod from the controlling lever; Fig. 11, is a transverse vertical section on the line 11—11 of Fig. 10; Fig. 12, is a horizontal section of a modified form of my change speed gear; Fig. 13, is a plan, partly in horizontal section, illustrating the detail construction of the axle used to support the gear case, and Fig. 14, is a side elevation, partly in section, and on a reduced scale, further illustrating the construction of the rear axle and gear case shown in Fig. 13.

In the above drawings, A is a gear case containing the change speed and differential gears for a motor vehicle and it is usually made in two halves separating in a horizontal plane. Into said case extends the driving shaft B from the engine and also two live or driven shafts C and C', which are operatively connected to each other in the present instance through the ordinary differential gearing illustrated at D. The gear case, as indicated in dotted lines in Fig. 13, is provided with lateral tubular extensions $a'$ and $a^2$, each flanged for attachment to the axle structure of the vehicle. This axle structure consists of a steel casting Q as shown in Figs. 13 and 14, having relatively straight tubular portions $q$ connected by a downwardly and forwardly curved structure $q'$. The live or driven shafts C and C' extend within the portions $q$ of the axle structure and are connected in any desired and suitable manner to the driven or rear wheels, of which one is illustrated at R. This axle structure is provided with two flanges $q^2$ and $q^3$ of which the former serves for the attachment of the gear case A, while to the latter is connected in any suitable manner a plate or frame $r$ constituting a portion of the brake structure. Each end of the main connecting part $q'$ of the axle structure terminates between the two flanges $q^2$ and $q^3$, at which point there is also provided (preferably integral with said axle structure) a plate $q^4$ for attachment to the frame of the motor vehicle. It will be noted that the part $q'$ of the axle structure is curved downwardly and forwardly so as to pass under the gear case A without decreasing the bottom clearance of the motor vehicle:—the gear case in the present instance being recessed as indicated at $a^3$ to provide for the reception of this part. In the present instance the differential gearing is contained in a case or frame formed by two castings $d'$ and $d$, connected together in any suitable manner and supported within the main gear case A is any suitable bearings, while in the present instance are of the ball type. One of these bearings is illustrated at $d^2$ and it will be noted that there is also a bearing $d^3$ provided to take the end thrust of that portion of the casting $d'$, which is of a sleeve shape and surrounds the shaft C. This same casting has a portion $d^4$ in the form of a radially placed plate or disk having fastened to it in any suitable manner two beveled gears $d^5$ and $d^6$.

The driving shaft B has at that end which enters the gear case A a portion $b$ of irregular shape, having, in the present instance, a fluted form so as to fit into and be capable of driving a similarly fluted sleeve $b'$. An intermediate shaft E forming the end section of the driving shaft fits into this sleeve, and while being fluted for a suitable part of its length so as to be driven thereby, has a cylindrical rear end $e$ designed to operate in a bearing formed in the gear case A. This bearing is made up of a sleeve like extension $e'$ integral with a beveled pinion $e^2$ and free to turn upon two series of balls $e^3$ and $e^4$ mounted between it and the gear case A. A sleeve of suitable material is interposed between the interior of the extension $e'$ and the portion $e$ of the shaft E, and in addition there is provided a thrust bearing $e^5$ of the ball type between the series of balls $e^4$ and a suitable inwardly projecting portion of the gear case indicated at $e^6$; the thrust being transmitted from the beveled gear $e^2$ and the extension $e'$ to this bearing through a nut $e^7$ on the end of said extension. The forward end of the sleeve $b'$ is carried in ball bearings $b^2$ mounted in the gear case A and there is also a thrust bearing $b^3$ of the ball type constructed to transmit to the gear case any end thrust on said sleeve. The sleeve $b'$ is fluted both internally and externally so that it not only directly transmits power from the driving shaft B to its end section E, but also is capable of driving a gear $b^4$ slidably mounted upon it and provided with an operating collar $b^5$ for the reception of a yoke $b^6$ mounted upon an operating rod $n$ hereafter described. This gear $b^4$ is rigidly connected in any desired manner with the shaft section E so that while it is free to move upon the sleeve $b'$, such movement causes the said shaft to be moved longitudinally in the sleeve and in the bearing for its rear end. In the present instance I have shown a screw $b^7$ extending through a slot in the sleeve $b'$ and immovably connecting the gear $b^4$ with the shaft E.

A second beveled gear $e^8$ having a sleeve-like extension $e^9$ is mounted upon the shaft section E in such manner that it is adjacent to the beveled gear $e^2$, and both of these gears have internal teeth as illustrated in Fig. 3. This second beveled gear $e^8$ is permanently in mesh with the beveled gear $d^5$, while the gear $e^2$ permanently meshes with the beveled gear $d^6$.

The shaft section E carries between the gears $e^2$ and $e^8$ a toothed structure $e^{10}$ designed to engage the internal teeth of either pinion when said shaft is properly moved longitudinally. Mounted upon the extension $e^9$ of the gear $e^8$ is a gear $f$ having a collar engaged by a yoke $f'$ fixed to an operating rod $n'$; it being noted from Fig. 4 that said extension is fluted so that said gear is free to slide upon it while being compelled to turn therewith. Also mounted in the gear case are a secondary shaft G and a reverse shaft H which have suitable bearings and extend parallel with the driving shaft B. The secondary shaft G has keyed to it three gears $g$, $g'$ and $g^2$, the latter being shown in dotted lines in Fig. 4 and its edge being indicated in Fig. 3. The reverse shaft H carries a single gear $h$ permanently in mesh with the gear $g^2$ and capable of being engaged by the gear $f$ when this latter is moved rearwardly upon the extension $e^9$. The gear $g'$ is of such a diameter as to be engaged by the gear $f$ when this is moved forwardly, it being noted that the gears $h$ and $g'$ are such a distance apart that it is possible for the gear $f$ to occupy a position between and yet disconnected from both of them. The gear $g$ is of such a diameter as to mesh with the gear $b^4$, though when the shaft section E is so moved that its toothed structure $e^{10}$ engages the internal teeth of either of the gears $e^2$ or $e^8$, these two gears $b^4$ and $g$ are disconnected.

When operating rod $n'$ is moved forwardly while the rod $n$ is in the position shown in Fig. 3, the gear $f$ is brought into mesh with the gear $g'$ and power is transmitted from the driving shaft B, sleeve $b'$ and shaft section E through the gear $b^4$ to the gear $g$, thence through the shaft G to the gear $g'$. From this latter the power is transmitted to gear $f$, extension $e^9$, beveled gear $e^8$, beveled gear $d^5$, and thence to the two shafts C and C' through the differential gearing. As a result, the motor vehicle is driven at its lowest forward speed and it will be noted that any thrust upon the beveled gear $e^8$ is transmitted from the extension $e^9$ through a ball bearing or equivalent structure $e^{12}$ to the sleeve $b'$ and the thrust bearing $b^3$ to the gear case. The second speed is secured by moving the rod $n$ forwardly from the position shown in Fig. 3, while leaving the rod $n'$ in its neutral position, in which case the gear $b^4$ is moved out of engagement with the gear $g$ and the toothed structure $e^{10}$ is brought into engagement with the internal teeth of the gear $e^3$, it being understood that the shaft section E slides bodily in the sleeve $b'$ and in its rear bearing to permit of this action. As a result, power is transmitted from the shaft B through the sleeve $b'$ and through the shaft E, toothed structure $e^{10}$, beveled gear $e^8$, and so to the beveled gear $d^5$ and the shafts C and C'. The third or highest forward speed is secured by moving the operating rod $n$ rearwardly from the position shown in Fig. 3, at which time the gear $b^4$ is again clear of the gear $g$ and the toothed structure $e^{10}$ is brought into engagement with the internal teeth of the gear $e^2$. Power is then transmitted from the shaft B through the sleeve $b'$, shaft E, toothed structure $e^{10}$, beveled gear $e^2$ and through the beveled gear $d^6$ to the shafts C and C'. In both these latter cases neither the reverse nor the secondary shafts are turned so that there is thus a minimum of wear on the elements of the gearing.

In order to reverse the direction of rotation of the shafts C and C', the operating rod $n'$ is moved to the rear, so that the gear $f$ is brought into engagement with the reverse gear $h$. Power is then transmitted from the shaft B through the sleeve $b'$, shaft section E, gears $b^4$ and $g$, shaft G, gears $g^2$, $h$ and $f$, to the beveled gear $e^8$ and thence to the beveled gear $d^5$ and to the shafts C and C'.

In order to secure the combination of gearing above described, I provide a lever K mounted upon a shaft $k$ so as to be free to slide sidewise thereon as well as to turn. Said lever has a downwardly extending arm $k'$, to the end of which is connected by any suitable form of universal joint, a rod $k^2$ for actuating at will either of the operating rods $n$ or $n'$. Each of said rods, as shown in Figs. 7 and 8, is transversely notched or slotted at its end so as to be capable of receiving the operating portion $k^3$ at the end of the rod $k^2$ whereby it may be longitudinally moved.

For the purpose of preventing movement of that one of the rods $n$ or $n'$ which is not operatively coupled to the rod $k^2$, I provide a locking gate L. This consists of a frame in the present instance fitting around the ends of the rods $n$ and $n'$, and provided with portions $l$ of such a thickness as to be capable of entering the notches or recesses in the ends of said rods. Between said two parts $l$ is an opening equal in width to that of the rods $n$, $n'$ or $k^2$ and of a height such as will cause the gate to hold together the rod $k^2$ and that one of the rods $n$ or $n'$ to which it is coupled.

The gate L is provided with an extension $l'$ which is slidable in a bearing provided by a bracket $a$ supported from the gear case A and has connected to its opposite end an arm $l^2$ which is fixed to a rotatably mounted rod $l^3$, in the present instance of a tubular construction. This rod extends forwardly to some point adjacent to the lever K where it is provided with an arm $l^4$. A link $l^5$ of suitable construction serves to connect this arm with the hub of the lever K so that as the latter is moved sidewise on its supporting shaft or bar $k$ the rod $l^3$ will be given a partial revolution. As a result, when it is desired to move one of the rods $n$ or $n'$ to place the gears in the gear case A in any desired combination, the lever K is first moved sidewise upon its shaft $k$ until it occupies a position which will leave one of said operating rods free to move while locking the other in position. This is accomplished by reason of the fact that the sidewise movement of the lever K causes turning of the rod $l^3$ and consequent shifting of the locking gate L from one to the other of its two positions. As shown in Fig. 7, said gate has such an internal contour between its two parts $l$ that one of the rods is free to be moved longitudinally when in this opening, while the other is held from moving because one of its parts $l$ extends into the notch or recess in its end. Moreover, a suitable transverse movement of the locking gate moves the end of the rod $k^2$ sidewise from engagement with one of the rods, as $n$, into engagement with the other, as clearly shown in Fig. 7. As a consequence the latter rod is free to move longitudinally while the former is held against such movement, it being obvious that the rotary movement of the rod $l^3$ is transmitted through the arm $l^2$ to the gate L. The turning of the lever K on its supporting shaft $k$ then results in a longitudinal movement of the rod $k^2$ and consequently a similar movement of that one of the rods $n$ or $n'$ which is coupled to its rear end, with the result that one of the above described four possible combinations of gears in the case A is made.

For the purpose of guiding the lever K and of indicating the particular combination of gears existing at any time, I provide a slotted guide plate M supported from the body of the motor vehicle in such manner as to coöperate with the lower portion of said lever K in the manner well known in the art.

It is to be understood that the joint between the arm $k'$ and the rod $k^2$, as well as those between the arms $l^2$ and $l^4$ of the rotary rod $l^3$ and their associated parts, are so made as to permit of a substantially universal movement of said parts, it being obvious that some such construction is advisable at the above indicated points, because of the fact that one end of each of the rods $l^3$ and $k^2$ is operative upon mechanism movable with the gear case A, while their opposite ends are connected to the lever K which is mounted upon the relatively movable frame of the vehicle.

In Figs. 10 and 11, I have illustrated a modified form of means for connecting the operating rod $k^2$ with the longitudinally movable rods for controlling the combinations of a change speed gear employing three of these latter rods, such for example as is illustrated in Fig. 12. In this case, instead of permitting the change speed gear rods $n$ and $n'$ and $n^2$ to project outside of the gear case A, I extend the operating rod $k^2$ into such case and so support its end that it is both revoluble and free to move longitudinally. Fixed to said end in any desired manner is an arm $k^6$, whose end is capable of entering suitable transverse notches or slots in the ends of any one of the control rods $n$, $n'$ or $n^2$. In order, therefore, to actuate any one of these latter rods, it is only necessary that the rod $k^2$ be turned through an angle necessary to cause the arm $k^6$ to engage with the proper one of the control rods $n$, etc., after which the longitudinal movement of said operating rod will impart the proper movement to the control rod to which it is connected.

For the purpose of preventing the escape of oil from the gear case around the rod $k^2$, I provide this with an elongated sleeve or bushing $k^7$ at the point where it passes through the gear case, as shown in Fig. 10. A locking gate L' is provided for this form of the control mechanism, and like that previously described, it is constructed to prevent movement of those control rods which it is not desired to operate at any particular time.

In Fig. 12, I have illustrated a modification of my improved change speed gear designed to be controlled by three instead of two control rods. In this case, the longitudinally movable end section of the driving shaft is, as indicated at E', connected to the main portion of said shaft by means of a sleeve $b^8$ to which is rigidly attached a spur gear $b^9$. This is permanently in mesh with a spur gear $g^3$ on the secondary shaft G' which has slidably mounted upon it a spur gear $g^4$. The reverse shaft H carries slidably mounted on it a wide faced gear $h^3$ designed to simultaneously engage, and therefore operatively connect, the gear $g^4$ and the gear $f^5$ rigidly fixed to the sleeve $e^9$ which carries the beveled gear $e^8$. As before there is a beveled gear $e^2$ but this is provided with an extension projecting through the gear $e^8$ and into its extension as indicated at $e^{13}$. As in the case shown in Fig. 3, the longitudinally movable end section E' of the driving shaft has a toothed structure $e^{10}$ capable of engaging the secondary teeth belonging to the bevel gears $e^2$ and $e^8$.

The shaft section E', the reverse gear $h^3$ and the spur gear $g^4$ are provided with collars for engagement by any suitable form of yokes attached to control rods in the well known manner. As is evident, this construction is especially available for use in constructions where it is desirable to place the two gears $e^2$ and $e^8$ between the driven shaft and the bearing by which said gears and the end of the shaft section E' are supported. In such case I preferably place a ball or other anti-friction bearing $e^{14}$ between the two gears $e^2$ and $e^8$.

I claim:

1. The combination of a driving shaft including a longitudinally movable section in line with the remainder and having a tooth or teeth, a sleeve of irregular interior and exterior contour connecting said shaft parts, a driven shaft, a beveled gear connected thereto, a second beveled gear mounted coaxially with the driving shaft and meshing with the first beveled gear, mechanism capable of connecting said sleeve with the second beveled gear, said second gear having an extension and being provided with supplementary teeth placed to be engaged by the tooth or teeth on the driving shaft when this is moved longitudinally, the movable shaft section projecting into said extension of the gear, and a bearing for supporting said extension.

2. The combination of a driving shaft having two sections in line with each other, a sleeve connecting said sections so as to cause them to turn together, a bearing for said sleeve constructed to take the longitudinal thrust thereon, means for moving one of the sections longitudinally, a toothed structure on said latter section, a gear having two sets of teeth and mounted coaxially with sets of teeth, one set of teeth being capable of said shaft, one set of teeth being capable of engagement by the toothed structure of the movable shaft section, a driven shaft, and a gear thereon meshing with said first gear with a gear on the sleeve and reversing means placed to be driven from said gear.

3. The combination of a driving shaft having a longitudinally movable section in line with the remainder, a sleeve connecting said parts, a gear slidable on but compelled to turn with the sleeve, two gears mounted co-axially with said section, and each provided with secondary teeth, a toothed structure on the movable shaft capable of engaging either set of secondary teeth, a driven shaft, gears thereon operatively engaging said first gears, and means for transmitting power from the gear on the sleeve to one of the gears on the movable shaft section.

4. The combination of a driving shaft having a longitudinally movable section in line with the remainder and operatively connected thereto, two gears mounted co-axially with said section and each provided with secondary teeth, a bearing, one of the gears having an extension projecting into said bearing and the end of the movable shaft section being supported in said extension, a toothed structure placed on said movable shaft section between said end and the remainder of the shaft, and arranged to engage either set of secondary teeth of said gears, a driven shaft, and gears thereon driven from said first gears.

5. The combination of a driving shaft and a driven shaft at right angles to each other, a supporting structure for said shafts, the driving shaft having a longitudinally movable end section in line with the remainder, a sleeve connecting said two parts of the driving shaft, a thrust bearing for said sleeve, two beveled gears mounted co-axial with the driving shaft and each provided with internal teeth, means for transmitting the thrust from one of said beveled gears directly to the thrust bearing of the sleeve independently of the supporting structure, a toothed structure on the movable shaft section capable of engaging either set of internal teeth, and two beveled gears connected to the driven shaft and meshing with said other beveled gears.

6. The combination of a driving shaft having a longitudinally movable end section in line with the remainder, a sleeve connecting said parts of the shaft, a gear mounted on the sleeve, a supporting structure provided with a bearing and placed to receive the end of the movable shaft section, a gear on said shaft section having secondary teeth, a toothed structure on the shaft capable of engaging the teeth, a driven shaft, a gear thereon meshing with the gear on the shaft, and means for transmitting power from the gear on the sleeve to said driven shaft.

7. The combination of a driving shaft consisting of a main portion and a longitudinally movable end section in line therewith, the adjacent portions of said parts of the shaft being of irregular shape, a sleeve connecting said parts so as to permit longitudinal movement of the end section while compelling it to turn with the remainder, a supporting structure having a bearing for said sleeve, a secondary bearing for the opposite end of the movable shaft section, a gear mounted co-axially with the driving shaft and having secondary teeth, there being a thrust bearing between the hub of said gear and said connecting sleeve, a toothed structure on the movable shaft section capable of engagement with said secondary teeth, a driven shaft, and a gear thereon meshing with said first gear.

8. The combination of a driving shaft, an independently rotatable beveled gear coaxial with said shaft, a driven shaft, a beveled gear thereon meshing with said first gear, two spur gears on the driving shaft of which one is fixed to said shaft and the other is operatively connected to the beveled gear thereon, a secondary shaft, two gears thereon of which one is in mesh with the spur gear fixed to the driving shaft and the other is capable of engagement by the second spur gear, and means for moving said second spur gear into and out of such engagement.

9. The combination of a driving shaft, an independently rotatable beveled gear co-axial with said shaft, a driven shaft, a beveled gear thereon meshing with said first gear, two spur gears on the driving shaft of which one is fixed to said shaft and the other is operatively connected to the first beveled gear, a secondary shaft, two gears thereon of which one is in mesh with the spur gear fixed to the driving shaft and the other is capable of engagement by the second spur gear, with means for moving said second spur gear into and out of such engagement, and means for longitudinally moving the driving shaft to cause the gear fixed thereon to be moved into and out of engagement with the first gear on the secondary shaft.

10. The combination of a driving shaft, an independently rotatable beveled gear co-axial therewith, a driven shaft, a beveled gear thereon meshing with said first gear, two spur gears on the driving shaft, of which one is fixed to said shaft and the other is operatively connected to the first beveled gear, a secondary shaft, two gears thereon of which one is in mesh with the spur gear fixed to the driving shaft and the other is capable of engagement by the second spur gear, means for moving said second spur gear into and out of such engagement, and means for rotatably connecting the driving shaft directly to the first beveled gear and at the same time moving the fixed gear of the driving shaft out of engagement with the first gear of the secondary shaft.

11. The combination of a driving shaft, a driven shaft, two gears respectively co-axial with said shafts for connecting the same, two spur gears on the driving shaft of which one is slidably mounted on one of said first gears so as to drive the same, a secondary shaft, three spur gears mounted thereon so as to be held from longitudinal movement, a reverse shaft, a single gear thereon capable of meshing with one of the gears of the secondary shaft, and means for moving one of the spur gears on the driving shaft into engagement either with the reverse gear or with the second of the gears on the secondary shaft, the remaining spur gear on the driving shaft being capable of engagement with the first gear of the secondary shaft.

12. The combination of a driving shaft having a longitudinally movable end section in a line with its main portion, a spur gear and a toothed structure rigidly fixed to said shaft section, a beveled gear and a spur gear rotatably connected but free to move toward and from each other independently of the driving shaft, said beveled gear having secondary teeth capable of engagement by the toothed structure of the movable shaft section, a driven shaft, a beveled gear thereon meshing with said first beveled gear, a secondary shaft, two gears thereon, means for moving the shaft section to cause its toothed structure to directly connect it to its beveled gear, and means for moving the independent spur gear on the shaft section into and out of engagement with one of the gears of the secondary shaft.

13. The combination of a driving shaft having a longitudinally movable end section in a line with its main portion, a spur gear and a toothed structure rigidly fixed to said end section, a beveled gear and a spur gear rotatably connected but free to move toward and from each other independently of the driving shaft, said beveled gear having secondary teeth capable of engagement by the toothed structure of the movable shaft section, a driven shaft, a beveled gear thereon meshing with said first beveled gear, a secondary shaft, two gears thereon, means for moving the shaft section to cause its toothed structure to directly connect it to the beveled gear and at the same time disengage the gear fixed to said shaft section from one of the gears of the secondary shaft, and other means for moving the independent spur gear into and out of engagement with the second gear of the secondary shaft.

14. The combination of a driving shaft, a secondary shaft parallel therewith, three gears on said secondary shaft, a reverse shaft, a gear thereon, a longitudinally movable end section forming part of the driving shaft, a gear rigidly fixed thereon but capable of being moved into and out of engagement with one of the gears of the secondary shaft, a second gear mounted on the movable shaft section but independent thereof, means for moving said independent gear into and out of engagement either with a second gear of the secondary shaft or with the gear of the reverse shaft, a third gear mounted on the movable shaft section and rotatably connected with the independent gear, means for directly connecting the movable shaft section with said third gear, and a driven shaft with a gear thereon operatively engaging said third gear.

15. The combination of a driving shaft, a gear rigidly fixed thereon, a beveled gear having a tubular extension and secondary teeth also mounted on said driving shaft, a third gear slidable upon but keyed to such extension, a secondary shaft, two gears thereon of which one engages the gear fixed to the driving shaft, means for moving the slidable gear into and out of engagement with the second gear of the secondary shaft, and means for connecting the beveled gear directly to the driving shaft.

16. The combination of a driving shaft, a gear rigidly fixed thereto, a beveled gear having a tubular extension and secondary teeth also mounted on said driving shaft, a third gear slidable upon but keyed to such extension, a secondary shaft, two gears thereon of which one engages the gear fixed to the driving shaft, means for moving the slidable gear into and out of engagement with the second gear of the secondary shaft, and means for connecting the beveled gear directly to the driving shaft and at the same time moving the gear fixed to the driving shaft out of engagement with the first gear of the secondary shaft.

17. The combination of a driving shaft having a movable section in line with its main portion, two beveled gears adjacent to each other and provided with internal teeth, said gears having tubular extensions, a structure on the movable shaft section capable of engaging either set of teeth, a supporting structure having a bearing for one of said tubular extensions, a gear mounted on the extension of one of the beveled gears, a spur gear fixed to the movable shaft section, a secondary shaft, two gears thereon, means for moving the shaft section to cause it to be directly coupled to either of the beveled gears, means for causing operative engagement of one of the gears on the secondary shaft and the gear on said tubular extension of said beveled gear, a driven shaft, and means for connecting the same to said beveled gears.

18. The combination of a driving shaft having a movable section in line with its main portion, two beveled gears adjacent to each other and provided with internal teeth, each of said gears having a tubular extension, a structure on the movable shaft section capable of engaging either set of teeth, a supporting structure having a bearing for one of said tubular extensions, a gear slidably mounted upon but rotatably fixed to the extension on the other beveled gear, a spur gear fixed to the movable shaft section; a secondary shaft, two gears thereon, means for moving the shaft section to cause it to be directly coupled to either of the beveled gears and at the same time disengage the gear fixed to it from one of the gears of the secondary shaft, means for moving the slidable gear into and out of engagement with the second gear of the secondary shaft, a driven shaft, and means for connecting the same to said beveled gears.

19. The combination of a driving shaft, a driven shaft made in two sections, a change speed gearing connecting said driving shaft with said driven shaft, a gear case for said change speed gearing having flanged outlets, an axle structure having tubular end sections for the reception of said driven shaft sections, and a main axle section connecting said tubular sections, there being flanges on said tubular sections rigidly attached to the gear case, and wheels mounted on said tubular sections.

20. The combination of a driving shaft, a driven shaft formed in two sections, a change speed gearing connecting the driving shaft and said driven shaft sections, a gear case having flanged outlets and constructed to inclose said change speed gearing, an axle structure consisting of two tubular flanged sections respectively inclosing the driven shaft sections, a main axle section connecting said tubular sections of the axle structure, one of the flanges on each section being constructed for connection to a flanged outlet of the gear case, and a brake structure connected to the second of the flanges of each tubular structure.

21. The combination of a driving shaft, a driven shaft made in two sections, an axle structure consisting of two tubular sections respectively inclosing said driven shaft sections, and each having flanges, wheels mounted on said tubular structures, an axle section connecting the two tubular structures, the same extending from between the two flanges of each structure, a gear case having flanged outlets each rigidly connected to one flange of each tubular structure, and a change speed gearing in said gear case connecting the driving and the driven shaft sections.

In testimony whereof, I have signed my name to this specification, in the presence of two subscribing witnesses.

POWELL EVANS.

Witnesses:
CLEAYTON NEWBOLD,
JOHN J. JACKSON.